United States Patent
Cohen et al.

(10) Patent No.: US 10,386,025 B2
(45) Date of Patent: Aug. 20, 2019

(54) ELECTRICAL COVER (71) Applicants: Bradley Cohen, Evans, CO (US); Brian Neece, Windsor, CO (US)

(72) Inventors: Bradley Cohen, Evans, CO (US); Brian Neece, Windsor, CO (US)

(73) Assignee: 2BR Creations, LLC, Evans, CO (US)

( * ) Notice: Subject to any disclaimer, the term of this patent is extended or adjusted under 35 U.S.C. 154(b) by 0 days.

(21) Appl. No.: 15/587,392

(22) Filed: May 4, 2017

(65) Prior Publication Data

US 2017/0323745 A1 Nov. 9, 2017

Related U.S. Application Data (60) Provisional application No. 62/331,962, filed on May 4, 2016.

(51) Int. Cl.
| | | |
|---|---|---|
| *F21S 8/02* | (2006.01) | |
| *H02G 3/08* | (2006.01) | |
| *H01R 13/447* | (2006.01) | |
| *H02G 3/14* | (2006.01) | |
| *H01H 21/08* | (2006.01) | |
| *B05B 12/24* | (2018.01) | |
| *B05B 12/20* | (2018.01) | |
| *B05B 12/26* | (2018.01) | |
| *H01H 29/08* | (2006.01) | |
| *H02G 3/02* | (2006.01) | |
| *H01R 13/44* | (2006.01) | |
| *F21V 17/00* | (2006.01) | |

(52) U.S. Cl.
CPC .............. *F21S 8/02* (2013.01); *B05B 12/24* (2018.02); *B05B 12/26* (2018.02); *B05B 12/29* (2018.02); *F21S 8/026* (2013.01); *H01H 21/08* (2013.01); *H01H 29/08* (2013.01); *H01R 13/447* (2013.01); *H02G 3/088* (2013.01); *H02G 3/14* (2013.01); *F21V 17/002* (2013.01); *H01R 13/44* (2013.01); *H02G 3/02* (2013.01)

(58) Field of Classification Search
CPC .......... H01H 21/08; H01H 29/08; H02G 3/14; H02G 3/088; H02G 3/02; F21S 8/02; F21S 8/026; H01R 13/44; H01R 13/447; B05B 12/24
USPC .......................................................... 174/66
See application file for complete search history.

(56) References Cited

U.S. PATENT DOCUMENTS

| | | | | |
|---|---|---|---|---|
| 2,383,621 | A * | 8/1945 | Schonitzer | H02G 3/088 220/3.8 |
| 5,955,702 | A * | 9/1999 | Grossman | H02G 3/14 174/66 |
| 6,916,989 | B2 * | 7/2005 | Broussard, Jr. | H02G 3/14 174/66 |
| 7,351,910 | B1 * | 4/2008 | Magisano | H02G 3/125 174/58 |
| 7,554,037 | B1 * | 6/2009 | Shotey | H02G 3/14 174/481 |

(Continued)

*Primary Examiner* — Dhiru R Patel
(74) *Attorney, Agent, or Firm* — Craig R. Miles; CR Miles P.C.

(57) ABSTRACT

An electrical cover including a pair of opposed rim sides having an amount of curvature between the pair of opposed rim sides, a switch guard medially disposed in the electrical cover, the switch guard including a pair of opposed grasp wall sides convex in relation to the interior space of the switch guard, and a pair of aperture elements disposed adjacent the switch guard.

8 Claims, 8 Drawing Sheets

(56) References Cited

U.S. PATENT DOCUMENTS

| | | | |
|---|---|---|---|
| 7,728,226 B2 * | 6/2010 | Drane | H01H 21/085 174/66 |
| 9,276,389 B1 * | 3/2016 | Elbaz | H02G 3/14 |

* cited by examiner

ELECTRICAL COVER

CROSS-REFERENCE TO RELATED APPLICATIONS

This application claims the benefit of U.S. Provisional Patent No. 62/331,962 entitled GuardSpark Covers and filed on May 4, 2016, which is specifically incorporated by reference herein for all that it discloses and teaches.

TECHNICAL FIELD

The invention relates generally to the field of commercial and residential electrical construction; and more particularly, to the field of preparing electrical wiring components prior to painting/texturing or otherwise finishing surrounding surfaces; and more particularly still, to electrical covers designed to fit over one or more electrical switches to protect said component during painting/texturing/finishing processes.

BACKGROUND

There are many products designed to cover and/or protect electrical switches (hereinafter, "electrical components") from receiving paint, texture, or other finishing materials (collectively, "finish materials") during finishing projects. This is important as such materials can enter electrical components and cause malfunctions, be unsightly, reduce functionality, or even create electrical wiring hazards. In such situations, removing materials from electrical components can be time consuming and difficult; it is a much better approach to keep such materials from entering the electrical components in the first place. One common partial solution is to tape over the electrical components before commencing finish work. However, this is a laborious and time consuming process that ultimately yields unimpressive results as the gaps between rows or columns of tape allow materials to enter the electrical components. Furthermore, during the taping process, it is easy to accidentally make contact with the interior of the electrical components leading to potential electrical shock hazards. Tape is not reusable and often lets loose or fails when touched, vibrated, or otherwise moved—simple exposure to sunlight can also cause tape to fail. Not to mention the unsightly residue that tape often leaves behind. The prior art has seen the shortcomings of tape and attempted to address them with plastic paint shields. However, most such shields utilize prongs that either project into the outlets or into the electrical boxes. Many modern outlets have safety tabs that defeat insertion of such prongs causing such paint shields to be unusable. Further, depending on the installation of electrical components, there may be no room for insertion prongs to fit into an electrical box to the side of switches or outlets. Again, failure of such paint shields results. Additional problems with prior art paint shields is that they are flat, flimsy and prone to cracking, so they often gap or buckle, leaving spaces through which finish materials can enter. Thicker, more rigid shields fail to account for variations in manufacturing tolerances between electrical components, so may not fit all electrical components. What is needed is an electrical cover that is arched instead of flat so as to provide a better seal once installed, is able to be pressure-fit so that no insertion prongs are necessary, and is easy to quickly add or remove in order to save labor during finishing projects.

SUMMARY

The electrical cover comprises a press-fit or other type of fastener held electrical cover. Embodiments of the electrical cover described herein provide flexible finish material covers that guard light switches from paint, spackling, and other foreign materials. The fastener-held covers utilize specifically shaped features on the surfaces help minimize stress in the cover. The fasteners used to hold the electrical covers are specifically designed to accommodate variations in manufacturers threaded hole positions and diameter tolerances. The electrical covers are shaped with an arched rear surface that assists in minimizing edge warping when the electrical cover is positioned against the wall surface. Features are also molded into the parts to assist and strengthen the cover flatness once installed, and thus protect against the intrusion of finish material behind the cover.

The above summary provides a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some initial concepts in a simplified form as a prelude to the more detailed description that is presented later.

BRIEF DESCRIPTION OF THE DRAWINGS

The aforementioned and other features and objects of the present invention and the manner of attaining them will become more apparent and the invention itself will be best understood by reference to the following descriptions of a preferred embodiment and other embodiments taken in conjunction with the accompanying drawings, wherein.

DETAILED DESCRIPTION

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples. Similarly, in this disclosure, language such as "could, should, may, might, must, have to, can, would, need to, is, is not", etc. and all such similar language shall be considered interchangeable whenever possible such that the scope of the invention is not unduly limited. For example, a comment such as: "item X is used" can be interpreted to read "item X can be used".

Exemplary embodiments are described below in the accompanying Figures. The following detailed description provides a review of the drawing Figures in order to provide an understanding of, and an enabling description for, these embodiments. One having ordinary skill in the art will understand that in some cases well-known structures and functions have not been shown or described in detail to avoid unnecessarily obscuring the description of the embodiments. Further, examples described herein are intended to aid in understanding the principles of the embodiments, and are to be construed as being without limitation to such specifically recited examples and conditions. As a result, the inventive concepts are not limited to the specific embodiments or examples.

Figure 1:
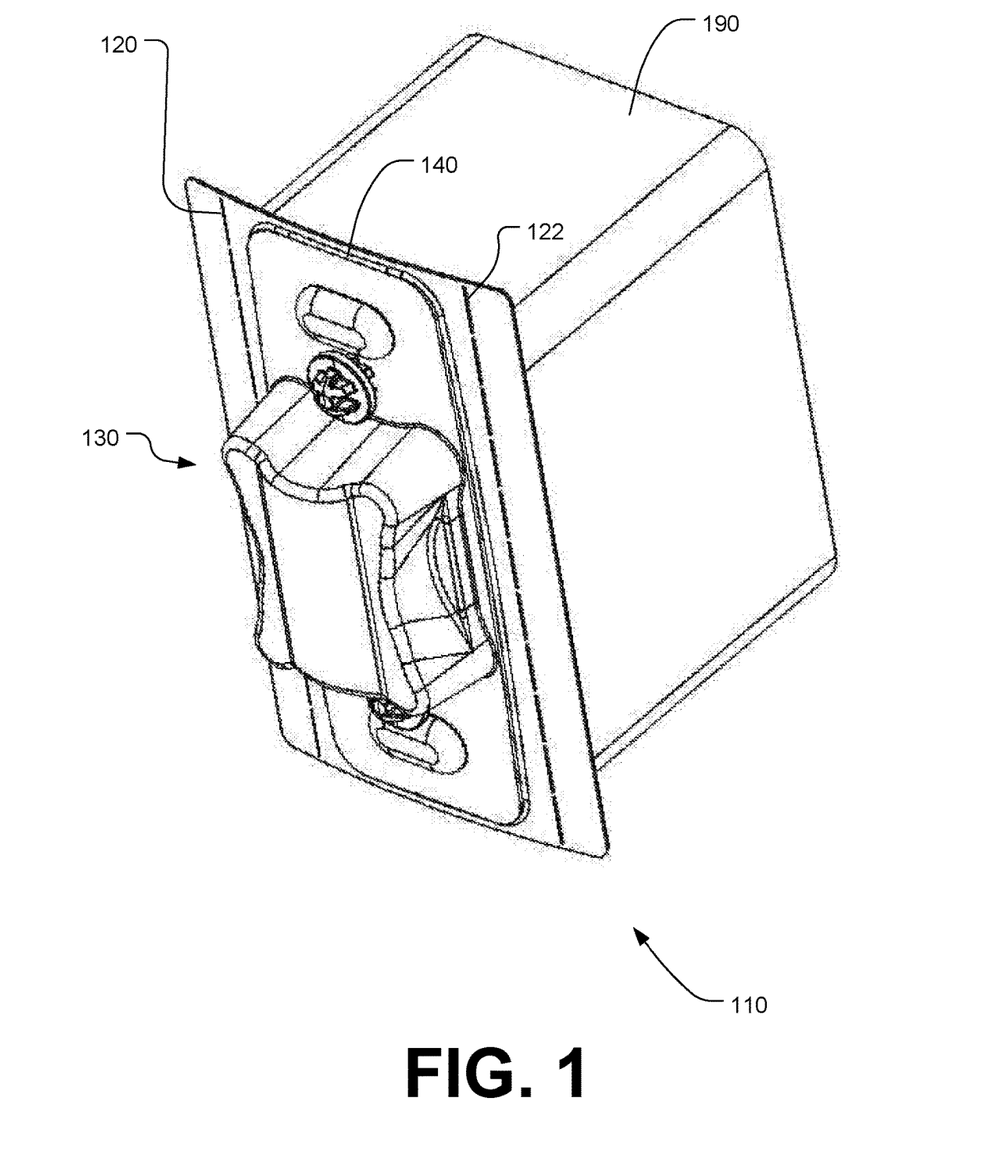
FIG. 1 illustrates a front perspective view of an exemplary embodiment of an electrical cover in place on a switch that is mounted on an electrical box.

Referring now to the drawings, FIG. 1 illustrates a front perspective view of an exemplary embodiment of an electrical cover 110 in place on a switch 192 that is mounted on an electrical box 190. The electrical cover in this embodiment is illustrated as being transparent, other embodiments may utilize translucent and/or opaque components. Running vertically along both sides of the electrical cover 110 is a plurality of scored cut-lines 120 and 122, these provide a simple guide for the user to cut away excess materials when using the electrical covers 110 on multiple side-by-side switches. In other embodiments, the scored cut-lines 120 and 122 can be deep enough that a user can simply bend the cover along those lines and snap off the excess rather than requiring cutting.

Note that FIG. 1 illustrates the electrical cover in place on a switch and mated electrical box 190. As such, the un-installed arch of the rear surface of the electrical cover is difficult to make out, see later FIGs. for more detail of the arch.

In the embodiment illustrated in FIG. 1, a raised plateau 140 is shown surrounding the switch 192. The raised plateau 140 provides clearance for switch bracketry and helps to sustain contact between the rear surface of the cover and the box and/or surrounding surfaces/walls. Extending up from the plateau 140 is the switch guard 130. The switch guard 130 is designed to surround the individual switch. Unlike the pressure fit hold of the electrical cover (see above FIGS. 1-4), the electrical cover 110 is held in place by a plurality of fasteners 160 and 162 (see later Figures).

Note that as the electrical cover 110 is pressed onto the switch, the arched shape of the back surface of the electrical cover is pressed approximately flat so that no gaps are available through which finish materials can enter either the switch or the electrical box. The electrical covers protect not only the switch itself, but associated wiring, wiring connections, and the walling materials (e.g., drywall) that surrounds the perimeter of the switch. The electrical covers shield the electrical components from paint and/or other surface finishing materials such as plastering or spackling that is sprayed and/or rolled onto a wall surface or surface finishing treatments such as grouting tiles. The electrical covers may be reused, and may be washable or disposable. The electrical covers can be fabricated from a low-cost thermally formed polymer plastic. The covers utilize negatively drafted contact surfaces to improve the overlapping friction holding force while minimizing material stress. A second arched surface formed into the center of the electrical cover improves the holding force as well. Rounded surfaces are designed into the covers to minimize the risk of cracking, make the electrical covers easier to form during fabrication, and improve the electrical covers life-cycle for reusability.

Figure 2:
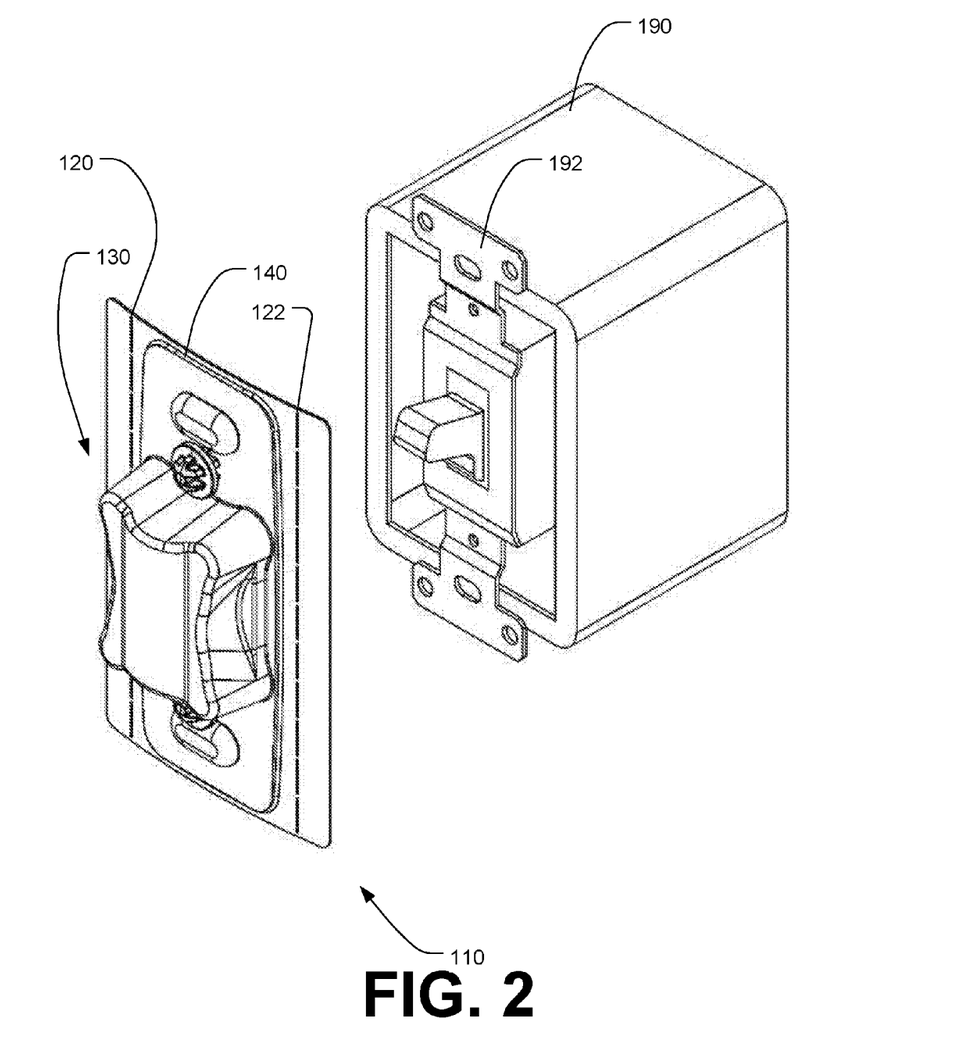
FIG. 2 illustrates a front perspective view of an exemplary embodiment of an electrical cover about to be emplaced on a switch that is mounted on an electrical box.

FIG. 2 illustrates a front perspective view of an exemplary embodiment of an electrical cover 110 about to be emplaced on a switch that is mounted on an electrical box. This view is provided to show the relationship between the invention and the electrical components on which it is used.

Figure 3:
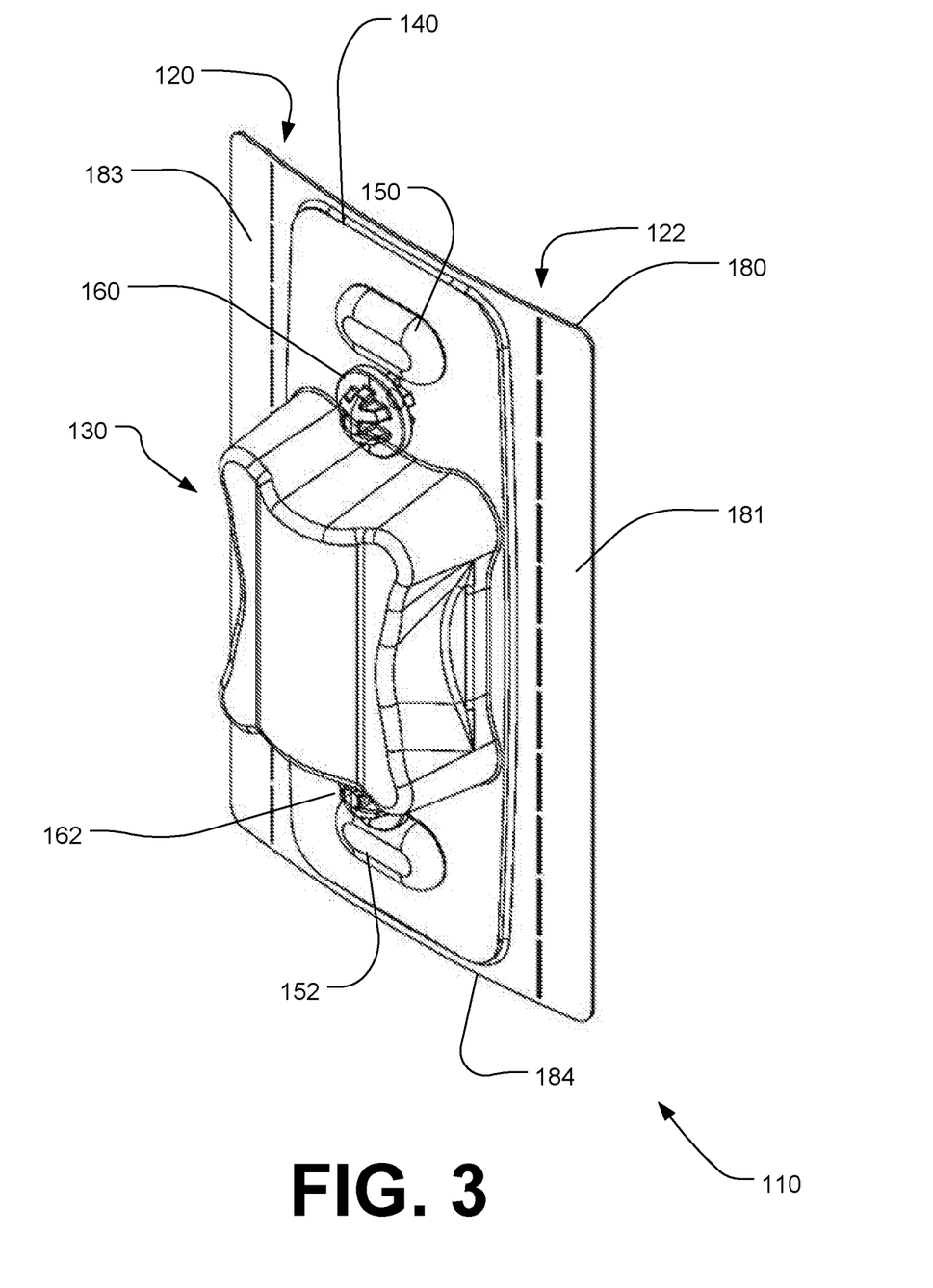
FIG. 3 illustrates a front perspective view of an exemplary embodiment of an electrical cover.

FIG. 3 illustrates a front perspective view of an exemplary embodiment of an electrical cover 110. In this view, the arch that is formed into the rear surface of the electrical cover 110 can be seen in the top rim 180. The arch is more easily discernable here than in FIG. 1 as this electrical cover is not installed. See later figures for an additional depiction of this feature. The right side rim 181 and left side rim 183 are depicted in this FIG., as is the bottom rim 184. As can be seen in the illustration, the rims are preferably somewhat thin so that they can be flexible and mold to the underlying surfaces once installed in order to minimize any gapping therebetween.

Moving from the top down, the first feature that is encountered on the raised plateau 140 is the fastener clearance 150. This feature allows the cover to clear any screws or other fasteners used to install the switch 192 in the electrical box 190. A second fastener clearance 152 is present near the bottom edge of the raised plateau 140. Between the two fastener clearances 150 and 152 is the switch guard 130. On the outer surface of the switch guard 130 can be an arched surface 175 (see later figures) that strengthens resistance against pinching the plurality of finger holds 174 and 176.

Note that the fasteners 160 and 162 can be screws, pressure-fit ribbed fasteners, or any other appropriate type of fastener that can interface with the mounting holes on the switches and firmly attach the electrical cover thereto. The fasteners allow for variations in the threaded hole position as well as variations in the threaded hole diameters. Note that the fasteners should allow for removable attachment of the electrical cover to the switch/box.

Figure 4:
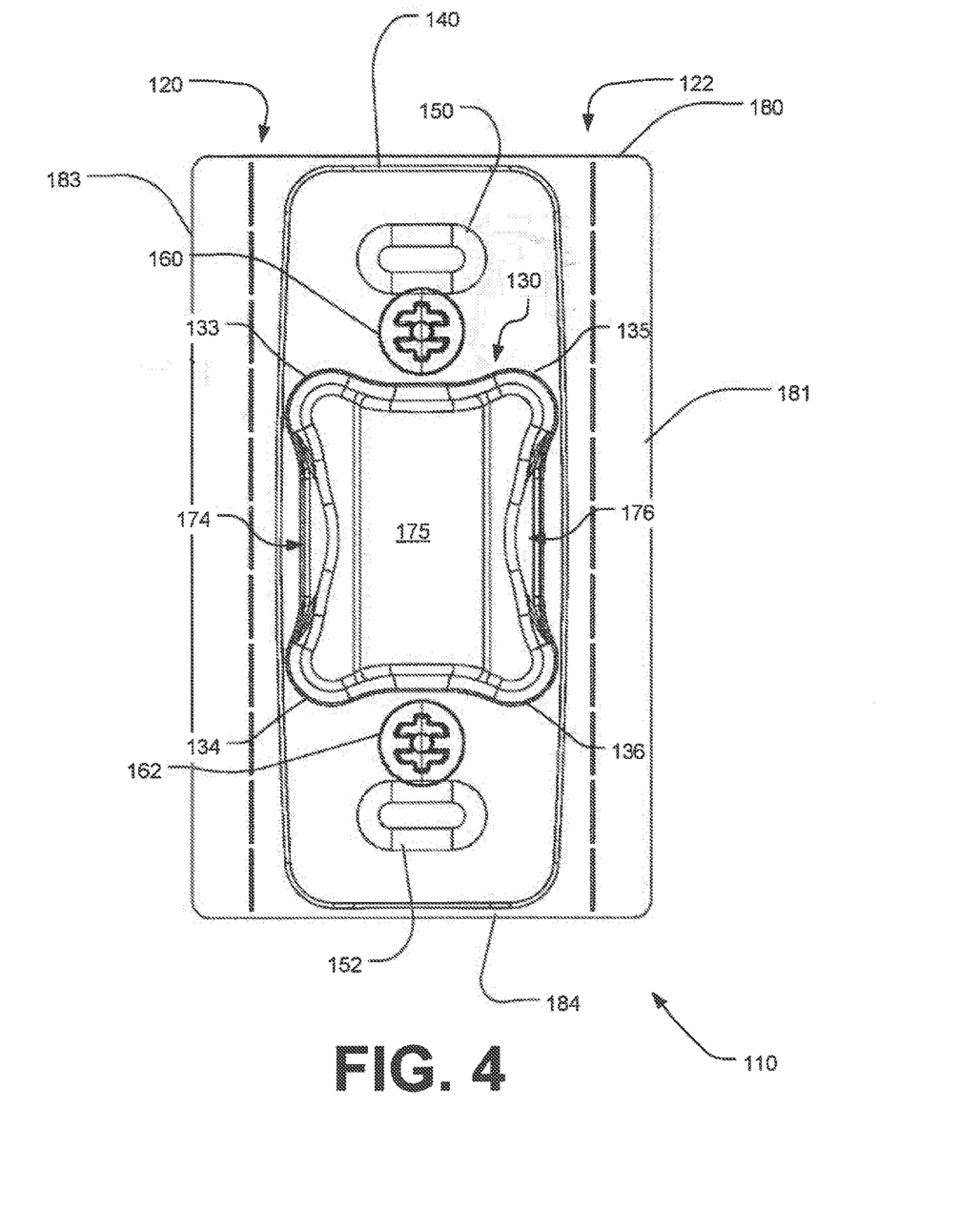
FIG. 4 illustrates a front elevation view of an exemplary embodiment of an electrical cover.

FIG. 4 illustrates a front elevation view of an exemplary embodiment of an electrical cover 110. In addition to all the subcomponents discussed above, FIG. 4 highlights a number of additional components.

The electrical cover 110 is designed with pressure points that allow the user to grasp and easily engage/disengage the electrical cover over a switch. In this FIG., these pressure points comprise the plurality of finger holds 174 and 176. By squeezing at these key points, the user can easily grasp and hold the electrical cover without covering his or her fingers with paint or other finish material that may have been inadvertently applied to the rims of the cover. The plurality of top spacer corners 133 and 135 and bottom spacer corners 134 and 136 provide flexibility to help the finger holds 174 and 176 function properly. As noted above, the cover can utilize surfaces that are negatively drafted relative to other drafted features on the surfaces that contact the electrical device to increase the overlap and help minimize stress in the cover.

Figure 5:
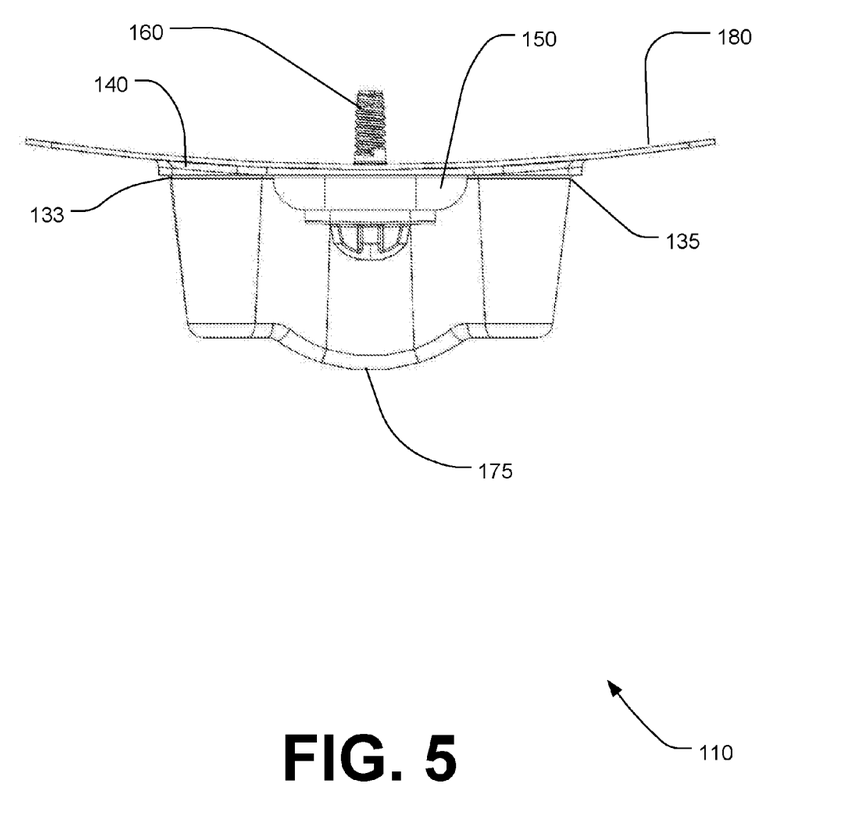
FIG. 5 illustrates a top plan view of an exemplary embodiment of an electrical cover.

FIG. 5 illustrates a top plan view of an exemplary embodiment of an electrical cover 110. Note the accentuated arch shape apparent in the top rim 180. The perimeter of the electrical cover is approximately flattened against the installation surface (wall, switch box, etc.) once installed and the arch causes constant pressure to be applied to the top, left, right, and bottom rims forcing them against the installation surface and minimizing gaps between the rims and the installation surfaces.

Figure 6:
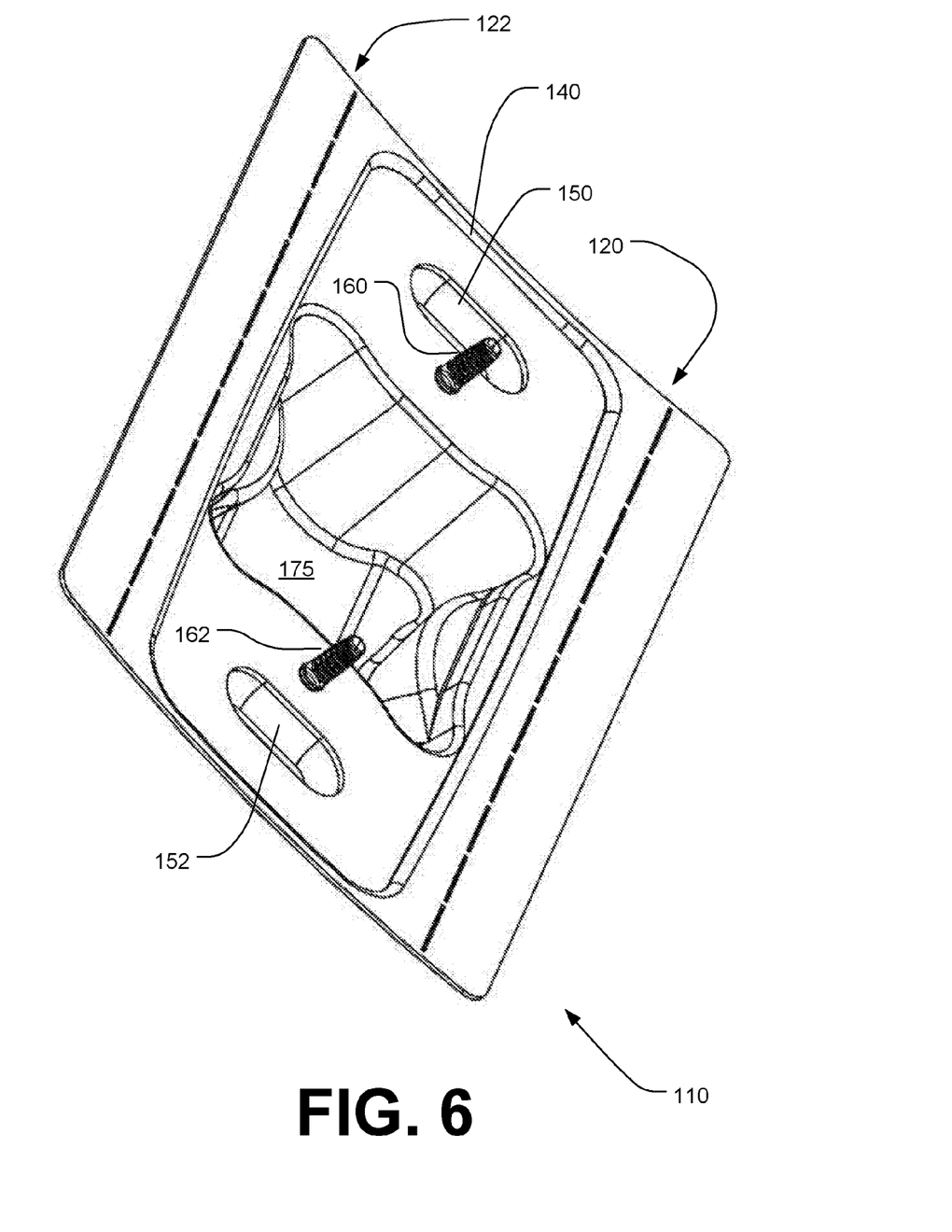
FIG. 6 illustrates a rear perspective view of the inside of an exemplary embodiment of an electrical cover.

FIG. 6 illustrates a rear perspective view of the inside of an exemplary embodiment of an electrical cover 10. Note that components referenced on earlier Figures are referenced here. This view is showing the rear of these components; said view can also be termed as an inside view as the previous views showed the front or external surface of the electrical cover while this view shows the internal surfaces.

Figure 7:
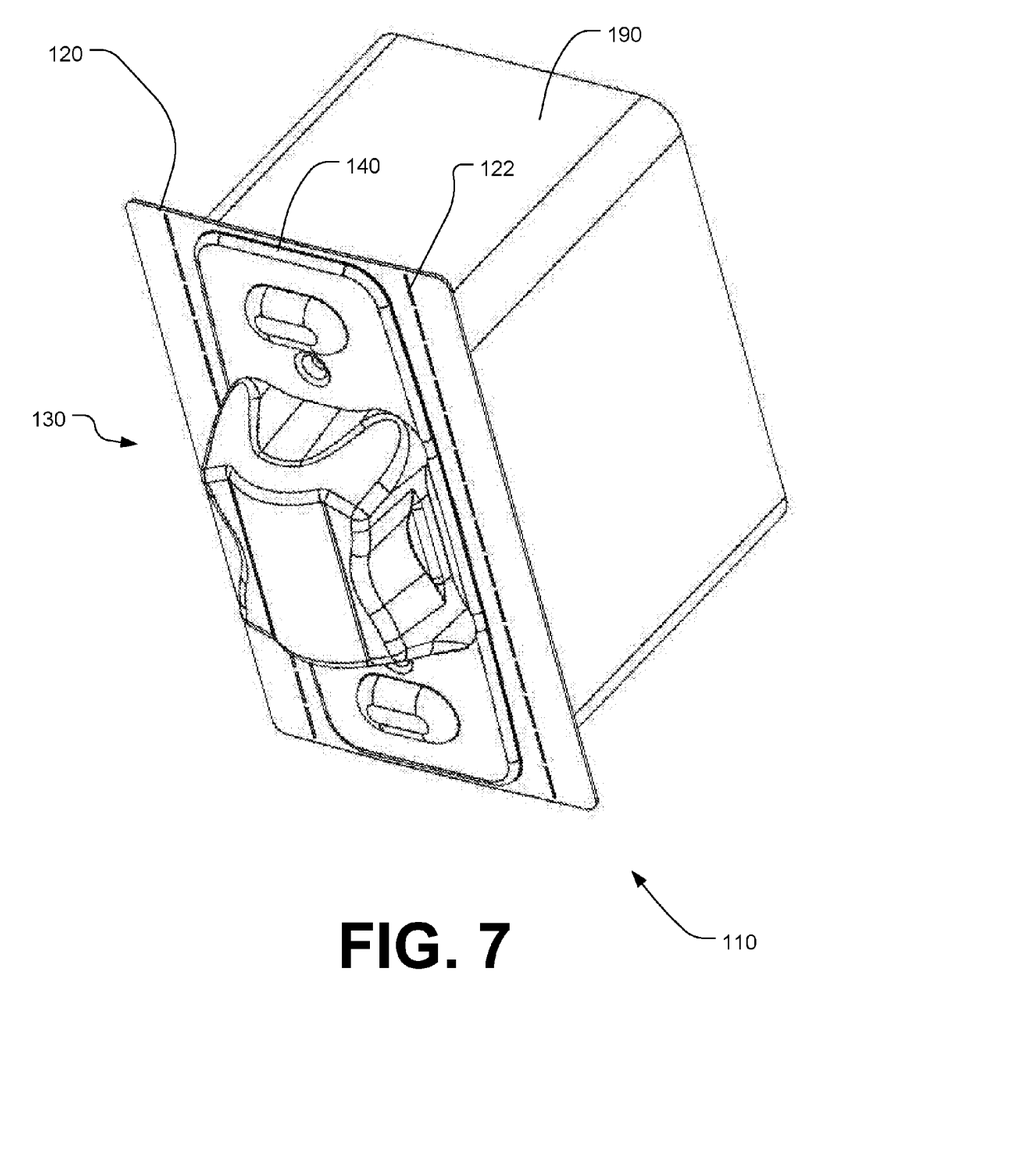
FIG. 7 illustrates a front perspective view of another exemplary embodiment of an electrical cover utilizing built-in fasteners in place on a switch that is mounted on an electrical box.

FIG. 7 illustrates a front perspective view of another exemplary embodiment of an electrical cover utilizing built-in fasteners 160 in place on a switch that is mounted on an electrical box. These appear 'missing' in FIG. 7, but can be seen formed onto the electrical cover in FIG. 8.

Figure 8:
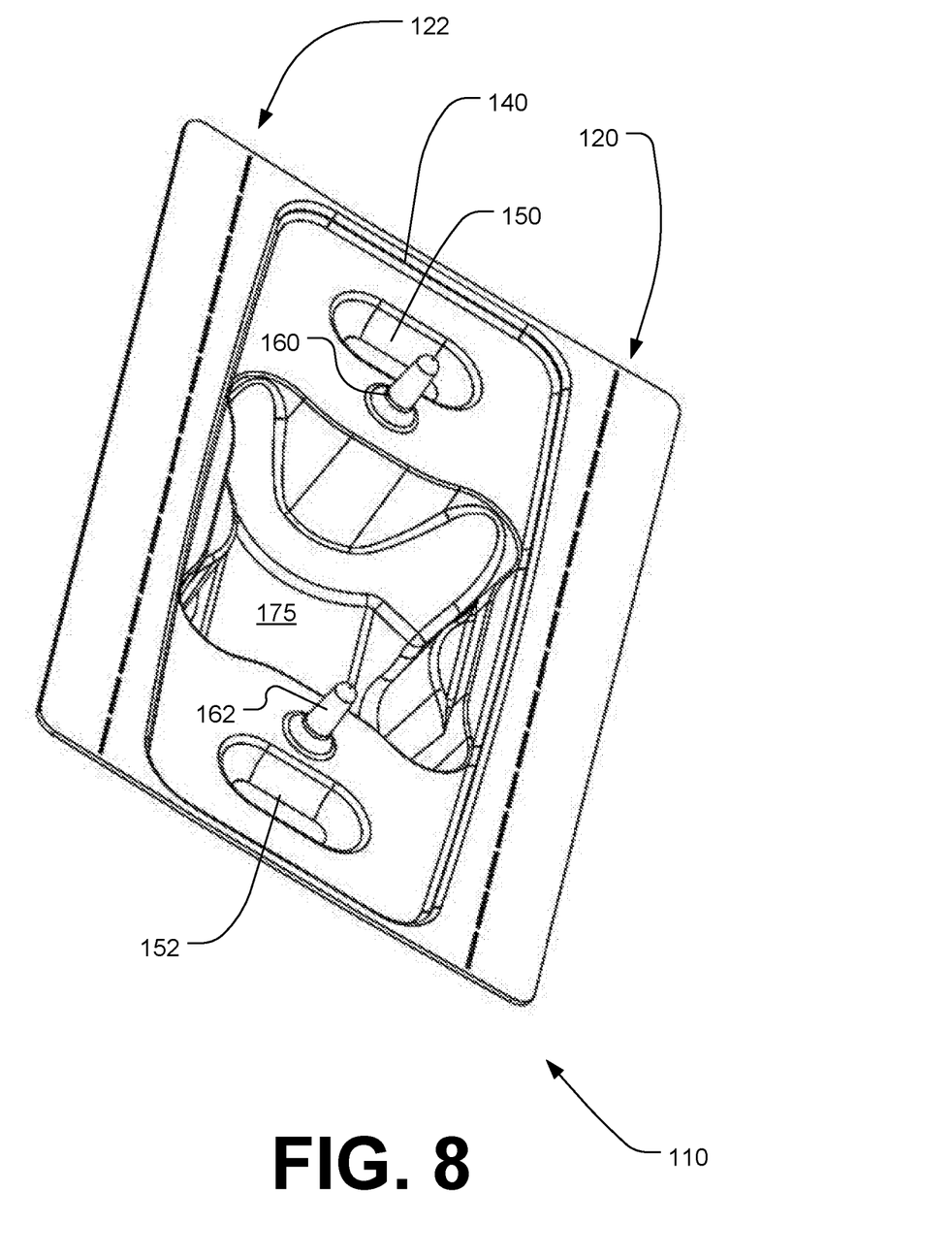
FIG. 8 illustrates a rear perspective view of the inside of another exemplary embodiment of an electrical cover utilizing built-in fasteners.

FIG. 8 illustrates a rear perspective view of the inside of another exemplary embodiment of an electrical cover utilizing built-in fasteners 160. These replace the separate fasteners 160 seen in earlier embodiments.

While particular embodiments have been described and disclosed in the present application, it is clear that any number of permutations, modifications, or embodiments may be made without departing from the spirit and the scope of this disclosure. Particular terminology used when describing certain features or aspects of the embodiments should not be taken to imply that the terminology is being redefined herein to be restricted to any specific characteristics, features, or aspects with which that terminology is associated. In general, the application should not be construed to be limited to the specific embodiments disclosed in the specification, unless the above Detailed Description section explicitly defines such terms. Accordingly, the actual scope of the inventions encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of embodiments can be modified, if necessary, to employ the systems, functions, and concepts of the various references to provide yet further embodiments.

In light of the above "Detailed Description," the Inventors may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventor. As discussed herein, specific terminology used when describing certain features or aspects should not be taken to imply that the terminology is being redefined herein to be restricted to any specific characteristics, features, or aspects of the embodiments with which that terminology is associated.

The above specification, examples and data provide a description of the structure and use of exemplary implementations of the described systems, articles of manufacture and methods. It is important to note that many implementations can be made without departing from the spirit and scope of the disclosure.

We claim:

1. A switch cover, comprising:
   an electrical cover extending to a pair of opposed rim sides;
   a raised plateau medially disposed on said electrical cover;
   a switch guard medially disposed in said electrical cover, said switch guard having a pair of opposed finger holds, each of said pair of opposed finger holds disposed between a top spacer corner and a bottom spacer corner of said switch guard;
   a first fastener clearance disposed proximate a top edge of said raised plateau; and
   a second fastener clearance disposed proximate a bottom edge of said raised plateau, wherein said first and second fastener clearance configured to cover a fastener.

2. The switch cover of claim 1, wherein each of said first fastener and said second fastener selected from the group consisting of: screws, pressure-fit ribbed fasteners, built in fasteners, or combinations thereof.

3. The switch cover of claim 1, wherein said pair of opposed finger holds each in convex relation to said switch guard.

4. The switch cover of claim 1, wherein said electrical cover having an amount of curvature between said pair of opposed rim sides.

5. The switch cover of claim 4, further comprising one or more scored cut lines disposed on said electrical cover adjacent said plateau.

6. The switch cover of claim 5, wherein said first and second fastener comprise an extension outward from said electrical cover in an opposite direction from said switch guard.

7. A switch cover, comprising:
   an electrical cover extending to a pair of opposed rim sides, said electrical cover having an amount of curvature between said pair of opposed rim sides;
   a raised plateau medially disposed on said electrical cover;
   a switch guard medially disposed in said electrical cover, said switch guard having a pair of opposed finger holds, each of said pair of opposed finger holds disposed between a top spacer corner and a bottom spacer corner of said switch guard;
   a first fastener;
   a second fastener, said first and second fasteners correspondingly disposed on said raised plateau adjacent said switch guard.

8. A switch cover, comprising:
   an electrical cover extending to a pair of opposed rim sides;
   a score cut-line disposed inward of each of said pair of opposed rim sides, said score cut-lines allow snap-off or cutaway of excess said electrical cover;
   a raised plateau medially disposed on said electrical cover;
   a switch guard medially disposed in said electrical cover, said switch guard having a pair of opposed finger holds, each of said pair of opposed finger holds disposed between a top spacer corner and a bottom spacer corner of said switch guard.

* * * * *